(12) United States Patent
Abdallh et al.

(10) Patent No.: US 11,078,368 B2
(45) Date of Patent: Aug. 3, 2021

(54) ACRYLATE COATING COMPOSITIONS COMPRISING A UV LIGHT CLEAVABLE CROSS-LINKING AGENT

(71) Applicant: Monash University, Clayton (AU)

(72) Inventors: Mustafa Abdallh, Clayton (AU); Milton Thomas William Hearn, Balwyn (AU); George Simon, Clayton (AU); Kei Saito, Clayton (AU)

(73) Assignee: Monash University, Clayton (AU)

( * ) Notice: Subject to any disclaimer, the term of this patent is extended or adjusted under 35 U.S.C. 154(b) by 188 days.

(21) Appl. No.: 16/122,364

(22) Filed: Sep. 5, 2018

(65) Prior Publication Data

US 2019/0071574 A1    Mar. 7, 2019

(30) Foreign Application Priority Data

Sep. 6, 2017 (AU) ................................ 2017225043

(51) Int. Cl.
| | |
|---|---|
| *C09D 4/00* | (2006.01) |
| *C09D 5/32* | (2006.01) |
| *C09D 7/40* | (2018.01) |
| *C09D 5/00* | (2006.01) |
| *C09D 133/06* | (2006.01) |
| *C09D 133/10* | (2006.01) |
| *C08F 120/14* | (2006.01) |
| *C08F 120/12* | (2006.01) |

(52) U.S. Cl.
CPC .............. *C09D 4/00* (2013.01); *C08F 120/12* (2013.01); *C08F 120/14* (2013.01); *C09D 5/00* (2013.01); *C09D 5/32* (2013.01); *C09D 7/40* (2018.01); *C09D 133/06* (2013.01); *C09D 133/10* (2013.01); *C08F 2810/20* (2013.01)

(58) Field of Classification Search
None
See application file for complete search history.

(56) References Cited

U.S. PATENT DOCUMENTS

2011/0251364 A1* 10/2011 Anthamatten et al. ..................... C08F 220/36
526/258

* cited by examiner

*Primary Examiner* — Sheeba Ahmed
(74) *Attorney, Agent, or Firm* — Knobbe Martens Olson & Bear LLP

(57) ABSTRACT

The present disclosure provides a coating composition for forming a coating that at least partially mobilizes in response to UV light, the composition comprising a monomer selected from acrylates, methacrylates and mixtures thereof, a cross-linking agent comprising two sub-units covalently bonded together, each sub-unit comprising an unsaturated group which is co-polymerisable with the monomer, wherein the two sub-units are adapted to dissociate in response to irradiation by UV light. The cross-linking agent may be present in the coating composition in an amount of less than 15 mol % of the total of the monomer and cross-linking agent.

20 Claims, 5 Drawing Sheets

ACRYLATE COATING COMPOSITIONS COMPRISING A UV LIGHT CLEAVABLE CROSS-LINKING AGENT

TECHNICAL FIELD

The present invention relates to coating compositions for forming an acrylate coating that at least partially mobilises in response to UV light, processes for forming such coatings, acrylate coatings that at least partially mobilise in response to UV light, and processes for healing a surface defect in such coatings. In particular, the coating compositions used to prepare the coatings comprise a cross-linking agent that comprises two sub-units covalently bonded together but which are adapted to dissociate in response to irradiation by UV light.

BACKGROUND OF INVENTION

In many applications of coatings, surface flaws or defects, such as scratches, may impair the performance of the coating. Defects on transparent polymer coatings, for example, can cause a loss of functionality of the coated device, such as an ophthalmic lens or a CD. Scratches on vehicle coatings may compromise both the functional properties of the coating, for example its ability to protect against corrosion, and the aesthetic appeal of the vehicle.

Acrylate polymers are widely used in such coating applications. In use, the acrylate polymers are generally cross-linked to give the desirable properties of rigidity, hardness, strength and thermal properties. Such coatings are produced by applying a coating composition, comprising acrylate and/or methacrylate monomers and cross-linking agents, to the substrate requiring coating, and inducing polymerisation in place to form the cross-linked coating adhered to the substrate. The coating composition may comprise a radical initiator and such other additives as are required in the final composition.

Self-healing polymer coatings are coatings designed with a capacity to "heal" defects such as flaws and scratches, either intrinsically or in response to an externally applied stimulus. Various different mechanisms of self-healing in polymer coatings have been reported. Coatings capable of "intrinsic healing" incorporate a reactive species, typically isolated in a containment device such a microcapsule which is embedded in the coating. The reactive species is released when a growing crack disrupts the containment device. The subsequent reaction of the reactive material in the crack repairs the crack and/or prevents further crack growth. While such systems may be capable of truly autonomous self-healing, they can only be healed once at the same location and are often not transparent to light due to multiple phases.

For many coating applications, "extrinsic healing" systems, wherein healing is achieved upon application of an externally applied stimulus, are thus preferred. For example, a covalently bonded functionality within the polymer molecular architecture may be stimulated to scission, thus reducing the glass transition temperature ($T_g$) and mobilising the polymer in the region of the defect. The mobilised polymer flows into the defect in order to decrease the surface area, and thus the surface energy, of the system. The polymer may subsequently be stimulated, or allowed, to re-form the primary covalently bonded functionality, so that the original properties of the coating (such as the $T_g$) are at least partially restored.

New acrylate coatings, with similar composition and properties to presently applied coatings, but which are capable of self-healing, are thus needed. Such coatings should preferably be capable of being produced using process equipment and processing conditions that are similar (ideally identical) to the process equipment and processing conditions of existing acrylate coating technologies.

A reference herein to a patent document or other matter which is given as prior art is not to be taken as an admission that the document or matter was known or that the information it contains was part of the common general knowledge as at the priority date of any of the claims.

SUMMARY OF INVENTION

We have now developed acrylate-based coating compositions and coating processes that may be used to form coatings that at least partially mobilise in response to irradiation by UV light.

In accordance with one aspect the invention provides a coating composition for forming a coating that at least partially mobilises in response to UV light, the composition comprising: a monomer selected from acrylates, methacrylates and mixtures thereof, a cross-linking agent comprising two sub-units covalently bonded together, each sub-unit comprising an unsaturated group which is co-polymerisable with the monomer, wherein the two sub-units are adapted to dissociate in response to irradiation by UV light. The cross-linking agent may be present in the coating composition in an amount of less than 15 mol %, preferably less than, 10 mol %, preferably less than 5 mol %, of the total of the monomer and cross-linking agent.

In accordance with another aspect the invention provides a process for coating a substrate with a coating that at least partially mobilises in response to UV light, the process comprising: providing a substrate to be coated, providing a monomer selected from acrylates, methacrylates and mixtures thereof, providing a cross-linking agent comprising two sub-units covalently bonded together, each sub-unit comprising an unsaturated group which is co-polymerisable with the monomer, wherein the two sub-units are adapted to dissociate in response to irradiation by UV light, contacting the substrate with the monomer and the cross-linking agent, and inducing co-polymerisation of the monomer and the cross-linking agent to form a polymer. The cross-linking agent may be contacted with the substrate in an amount of less than 15 mol %, preferably less than 10 mol %, more preferably less than 5 mol % of the total of the monomer and cross-linking agent contacted with the substrate.

In accordance with another aspect the invention provides a coating prepared by the process as described herein.

In accordance with another aspect the invention provides a coating formed by applying the coating composition as described herein to a substrate, and inducing polymerisation of the coating composition to form a polymer.

In accordance with another aspect the invention provides a coating that at least partially mobilises in response to UV light, comprising: a polymer comprising a monomer selected from acrylates, methacrylates and mixtures thereof and cross-linked by cross-linking groups, wherein the cross-linking groups comprise two sub-units covalently bonded together and adapted to dissociate by a cycloelimination reaction in response to irradiation by UV light to form pendant unsaturated groups, wherein the polymer, prior to irradiation by the UV light, comprises less than 5 mol %, preferably less than 2 mol %, most preferably none of the pendant unsaturated groups relative to the cross-linking groups. The cross-linking groups may be present in the polymer in an amount of less than 15 mol %, preferably less than 10 mol %, more preferably less than 5 mol %, of the total of the monomer and cross-linking groups.

In accordance with another aspect the invention provides a process for healing a surface defect in a coating as described herein, comprising: irradiating the coating in a region around the defect with UV light with a wavelength below 300 nm to at least partially mobilise the coating; and allowing polymer in the at least partially mobilised coating to flow into the defect.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
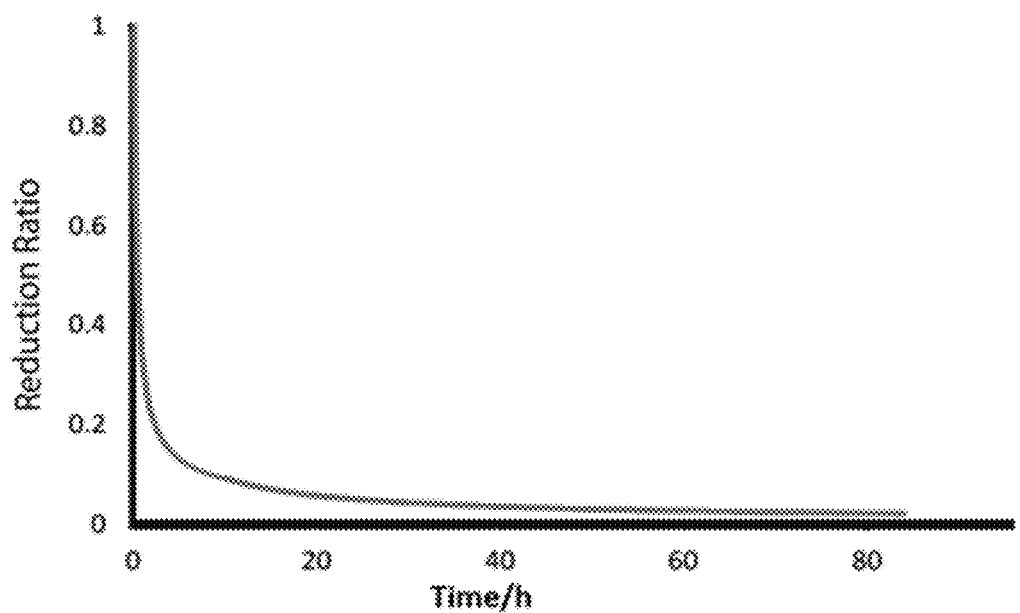
FIG. 1 is a graph showing the decrease in reduction ratio during polymerisation (1% AIBN, 80° C.) of a coating composition comprising n-butylmethacrylate and 3 mol % of 7-methacryloyloxycoumarin dimer.

The present invention relates to a coating composition for forming a coating that at least partially mobilises in response to irradiation by UV light. The coating composition comprises a monomer selected from acrylates, methacrylates and mixtures thereof, and a cross-linking agent present in the coating composition. The cross-linking agent may be present in the coating composition in an amount of less than 15 mol %, preferably less than 10 mol %, more preferably less than 5 mol %, of the total of the monomer and cross-linking agent. The cross-linking agent comprises two sub-units which are covalently bonded together. Each sub-unit comprises an unsaturated group which is co-polymerisable with the monomer, so that the covalently bonded cross-linking agent is able to cross-link the polymer chains formed when polymerising the monomers. The two sub-units are adapted to dissociate in response to irradiation by UV light, so that a cross-linked coating formed by polymerising the coating composition is able to be de-cross-linked, and thus at least partially mobilised, when irradiated with UV light.

Monomers

The monomer is selected from acrylates, methacrylates and mixtures thereof. Any monomer conventionally used to form acrylate coatings may be a suitable monomer for the coating composition. In some embodiments, the monomer is an acrylate, also known as a propenoate, which has the structure $CH_2=CH-C(O)-O-R$, where R is an organyl group. In some embodiments, the acrylate is an alkyl acrylate. In some embodiments, the acrylate is selected from methyl acrylate, ethyl acrylate, propyl acrylate, n-butyl acrylate and hexyl acrylate. In some embodiments, the acrylate is selected from methyl acrylate and ethyl acrylate.

In some embodiments, the monomer is a methacrylate, which has the structure $CH_2=C(CH_3)-C(O)-O-R$, where R is an organyl group. In some embodiments, the methacrylate is an alkyl methacrylate. In some embodiments, the alkyl methacrylate is selected from methyl methacrylate, ethyl methacrylate, propyl methacrylate, n-butyl methacrylate and n-hexyl methacrylate. In some embodiments, the alkyl methacrylate is selected from n-butyl methacrylate and n-hexyl methacrylate.

The monomer may consist of, or consist essentially of, a single acrylate or a single methacrylate. Alternatively, mixtures of two or more acrylates, or two or more methacrylates, or both an acrylate and a methacrylate may be used.

Cross-Linking Agents

The cross-linking agent comprises two sub-units which are covalently bonded together, each sub-unit comprising an unsaturated group which is co-polymerisable with the monomer. In some embodiments, the sub-units are identical. In other embodiments the sub-units are non-identical. Generally, the cross-linker comprises only two sub-units, each with a single co-polymerisable unsaturated group, so that the cross-linker is a di-functional cross-linker. However, it is not excluded that the cross-linker may comprise three or more sub-units, or that one or more of the sub-units may comprise a plurality of co-polymerisable unsaturated groups.

The unsaturated group which is co-polymerisable with the monomer may be any group capable of co-polymerising with acrylate or methacrylate monomers. In some embodiments the unsaturated group is a group which is conventionally used in cross-linking agents for acrylate polymer coatings. In some embodiments, the unsaturated groups on both (or all) of the sub-units are the same; however, it is not excluded that they may be different. In some embodiments, the co-polymerisable unsaturated group is an ethylenically unsaturated group, such as a vinyl group. In some embodiments, the co-polymerisable unsaturated group is selected from styrenyl, acryloyl (including acryloyloxy), and methacryloyl (including methacryloyloxy) groups. In some embodiments, the unsaturated group which is co-polymerisable with the monomer is an acryloyloxy or methacryloyloxy group. In some embodiments, it is a methacryloyloxy group.

The sub-units of the cross-linking agent are covalently bonded together, but are adapted to dissociate in response to irradiation by UV light. The sub-units may thus be connected together by any suitable covalently bonded functionality that may be cleaved by a photo-scission reaction when irradiated with UV light. In some embodiments, the two sub-units are adapted to dissociate by a cycloelimination reaction in response to irradiation by UV light. A cycloelimination reaction, sometimes also referred to as a cycloreversion or retrocycloaddition reaction, is the reverse of a cycloaddition reaction. Generally, the two sub-units are adapted to dissociate by a cycloelimination reaction of a cycloalkyl unit. However, other cyclic functionalities incorporating heteroatoms may also form a suitable basis for covalently linking the sub-units together.

In some embodiments, the two sub-units are adapted to dissociate by a [2π+2π] or a [4π+π4] cycloelimination reaction. By this it is meant that the cycloelimination reaction is the reverse reaction of a [2π+π2] or a [4π+π4] cycloaddition reaction, respectively. The cross-linking agent may thus be a [2π+π2] cycloaddition dimer or a [4π+π4] cycloaddition dimer of the two sub-units. In some embodiments, the cross-linking agent is a [2π+π2] cycloaddition dimer or a [4π+π4] cycloaddition dimer of two identical sub-units.

The wavelength of UV light that causes dissociation of the sub-units will depend on the specific photo-cleavable system used to couple the sub-units. A skilled person, with the benefit of this disclosure, will be able to select the appropriate wavelength to induce dissociation of the sub-units when required, for example when co-polymerised into an acrylate coating as a cross-linker. In some embodiments, the sub-units are adapted to dissociate in response to irradiation by UV light with a wavelength of below 300 nm, for example between 200 and 300 nm, or between 240 nm and 270 nm, or between 250 and 260 nm. In some embodiments, the sub-units are adapted to dissociate in response to irradiation by UV light with a wavelength of about 254 nm.

In some embodiment, the two sub-units are adapted to dissociate by a UV-induced [4π+π4] cycloelimination reaction. An example of a suitable functionality adapted to dissociate by [4π+π4] cycloelimination reactions in response to irradiation by UV light is an anthracene dimer, as depicted in Scheme 1. An anthracene dimer may be formed from anthracene-based sub-units under UV light with a wavelength of above 350 nm. The cyclooctyl ring of the dimer coupling unit may then be stimulated to scission under UV light at 254 nm.

Scheme 1

Anthracene

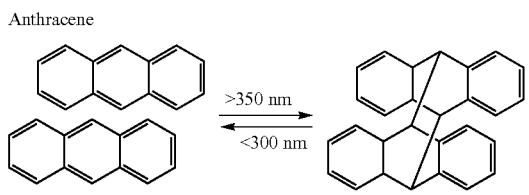

In some embodiments, the two sub-units are adapted to dissociate by a UV-induced [2π+π2] cycloelimination reaction. Suitable systems include cyclobutane ring systems which, upon [2π+π2] cycloelimination, produce alkenes forming part of an extended system of conjugation. In some embodiments, the scissionable cyclobutane ring systems of the cross-linker are originally assembled via [2π+π2] cycloaddition photodimerisation reactions, either by dimerisation of the sub-units themselves, or by synthetic precursors to the sub-units. The photodimerisation coupling reaction of suitable conjugated alkenes is generally produced in response to irradiation by a higher wavelength UV light than the UV light which induces the opposite, [2π+π2] cycloelimination reaction. In some embodiments, cyclobutane ring systems adapted for photo-cleavage under irradiation by UV light with a wavelength of less than 260 nm are formed by cycloaddition reactions when exposed to UV light with a wavelength of 300 nm and above, for example above 330 nm, or from 340 to 370 nm, such as about 350 nm or 366 nm.

Examples of suitable functionalities adapted to dissociate by [2π+π2] cycloelimination reactions in response to irradiation by UV light include dimers of cinnamic acid, thymine, coumarin and stilbene. These systems generally decouple under UV light with a wavelength of approximately 254 nm, and dimerise again under UV light at wavelengths at and above 300 nm, as depicted in Scheme 2.

Scheme 2

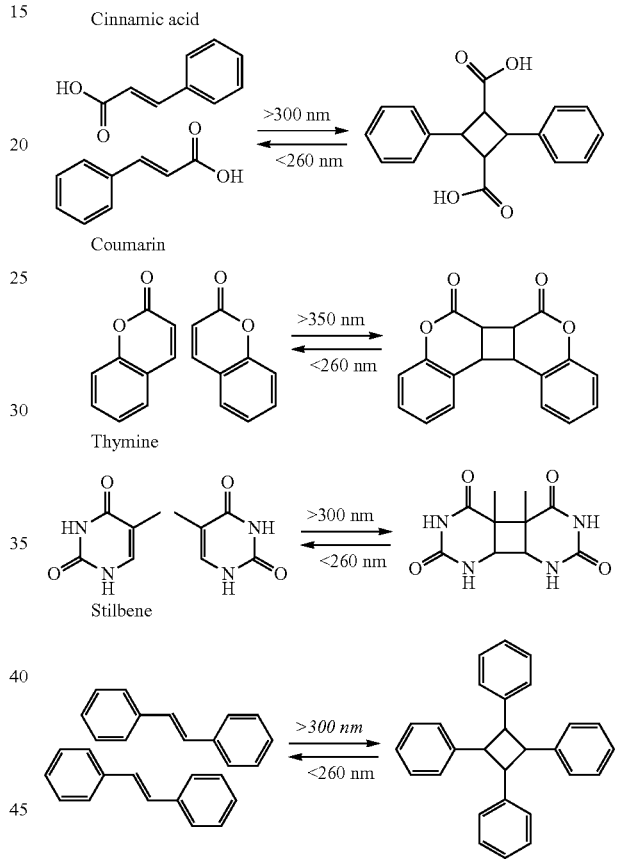

In embodiments where the two sub-units of the cross-linking agent are covalently bonded by an anthracene, cinnamic acid, thymine, coumarin or stilbene coupling system, the selected coupling system is functionalised with the co-polymerisable unsaturated group. As will be apparent to one skilled in the art, the anthracene, cinnamic acid, thymine, coumarin or stilbene coupling system should be functionalised, with the co-polymerisable unsaturated group and any other optional substitutions, at positions which do not interfere with the capability of the coupling system to undergo dissociation in response to irradiation by UV light.

In some embodiments, the coupling system, such as anthracene, cinnamic acid, thymine, coumarin or stilbene, is directly functionalised by the co-polymerisable unsaturated group. In other embodiments, a linking group may be provided to space apart the coupling system and the unsaturated group.

In some embodiments, the sub-units of the cross-linking agent comprise a coumarin group, and the two sub-units are thus covalently bonded together by a coumarin dimer system. Coumarin is able to dimerise into four different isomers: a syn head-to-head dimer, an anti head-to-head dimer, a syn head-to-tail dimer and an anti head-to-tail dimer, as shown in Scheme 3. The cross-linker comprising a coumarin dimer may adopt any one or a mixture of these isomeric configurations.

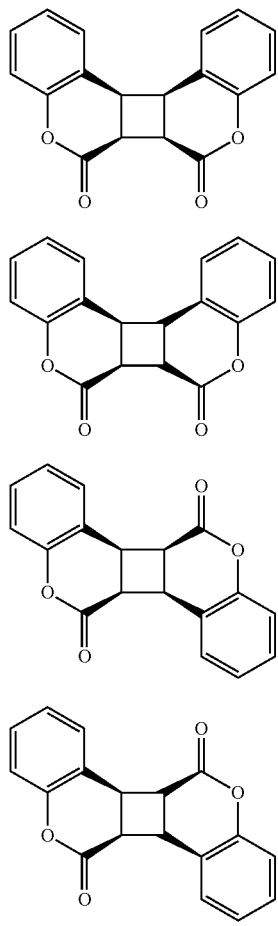

(a) syn head-to-head,
(b) anti head-to-head,
(c) syn head-to-tail
(d) anti head-to-tail The coumarin moiety may be substituted by the co-polymerisable unsaturated group at any position which does not unacceptably impair the capacity of the coumarin dimer to dissociate in response to irradiation by UV light. In some embodiments, the coumarin moiety is linked to the co-polymerisable unsaturated group at one of the 5, 6, 7 or 8-positions, preferably the 5 or 7 positions, most preferably the 7-position. In some embodiments, the coumarin is directly functionalised by the co-polymerisable unsaturated group, for example at the 7-position. In other embodiments, a linking group is provided to space apart the coumarin and the unsaturated group.

The coumarin coupling may optionally be substituted at other positions. For example, in some embodiments, a 4-methylcoumarin dimer links the sub-units. However, in some embodiments, the coumarin is unsubstituted (i.e. has only hydrogen) at the 4-position.

In some embodiments, the cross-linking agent is a molecule having the structure:

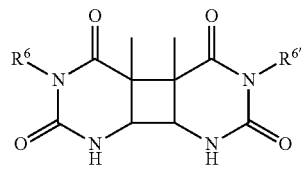

wherein $R^6$ and $R^{6'}$ are independently selected substituents comprising at least one ethylenically unsaturated group, preferably a terminal ethylenically unsaturated group. Such co-polymerisable groups, which may be the same or different in the cross-linking agent are usually reactive vinyl groups and may be selected from, for example, acryloyl, methacryloyl, acryloyloxy, methacryloyloxy, allyl, vinyl- or allyl-substituted aromatic, heterocyclic, or cycloaliphatic groups, vinyl- or allyl-substituted aryl-$C_1$ to $C_6$ alkyl and vinyl or allyl ester groups. In one set of embodiments the $R^6$ and $R^{6'}$ are of formula $CH_2=C(X)-C(O)O-(CH_2)_m-Y-$, wherein X is H or $CH_3$; m is 0-6 and Y is a bond, O or S.

In some embodiments, the cross-linking agent is a molecule having the structure:

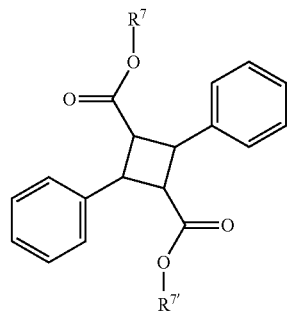

wherein $R^7$ and $R^{7'}$ are independently selected substituents comprising at least one ethylenically unsaturated group, preferably a terminal ethylenically unsaturated group. Such co-polymerisable groups, which may be the same or different in the cross-linking agent are usually reactive vinyl groups and may be selected from, for example, acryloyl, methacryloyl, allyl, vinyl- or allyl-substituted aromatic, heterocyclic, or cycloaliphatic groups, vinyl- or allyl-substituted aryl, $C_1$ to $C_6$ alkyl and vinyl or allyl ester groups. In one set of embodiments the $R^7$ and $R^{7'}$ are of formula $CH_2=C(X)-C(O)O-(CH_2)_m-$, wherein X is H or $CH_3$ and m is 1-6.

In some embodiments, the cross-linking agent is a molecule having the structure:

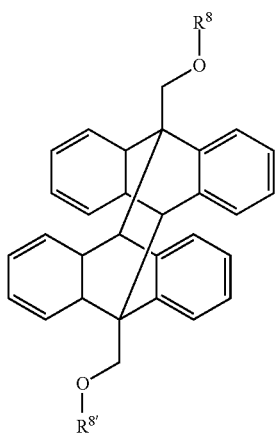

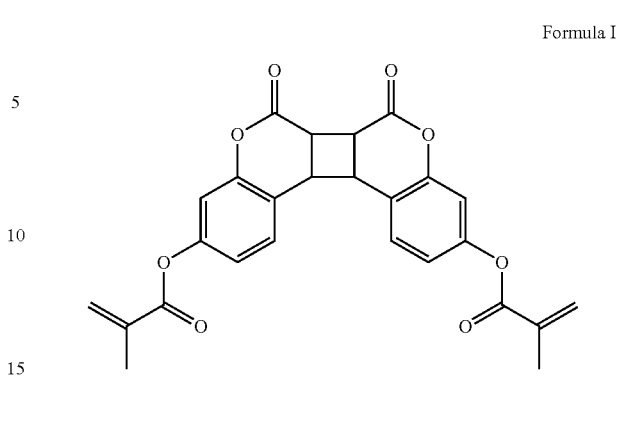

Formula I wherein R⁸ and R⁸' are independently selected substituents comprising at least one ethylenically unsaturated group, preferably a terminal ethylenically unsaturated group. Such co-polymerisable groups, which may be the same or different in the cross-linking agent are usually reactive vinyl groups and may be selected from, for example, acryloyl, methacryloyl, allyl, vinyl- or allyl-substituted aromatic, heterocyclic, or cycloaliphatic groups, vinyl- or allyl-substituted aryl-$C_1$ to $C_6$ alkyl and vinyl or allyl ester groups.

In some embodiments, the cross-linking agent is a molecule having the structure:

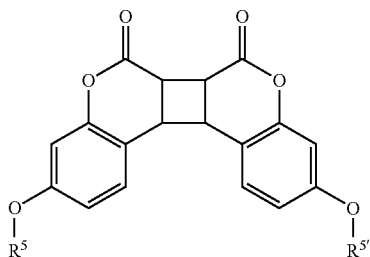

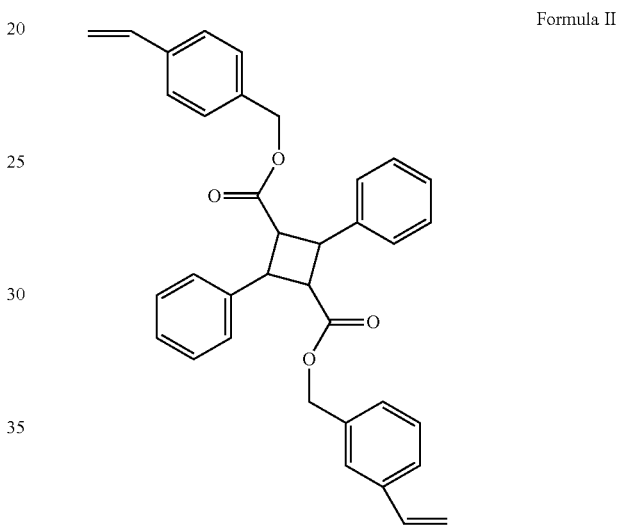

Formula II wherein R⁵ and R⁵' are independently selected substituents comprising at least one ethylenically unsaturated group, preferably a terminal ethylenically unsaturated group. Such co-polymerisable groups, which may be the same or different in the cross-linking agent are usually reactive vinyl groups and may be selected from, for example, acryloyl, methacryloyl, allyl, vinyl- or allyl-substituted aromatic, heterocyclic, or cycloaliphatic groups, vinyl- or allyl-substituted aryl-$C_1$ to $C_6$ alkyl and vinyl or allyl ester groups. In one set of embodiments the unsaturated group is of formula $CH_2=C(X)-C(O)O-(CH_2)_m-$, wherein X is H or $CH_3$ and m is 1-6.

In some embodiments, the cross-linking agent is a molecule having a structure selected from Formula I, Formula II, Formula III, Formula IV, Formula V and Formula VI:

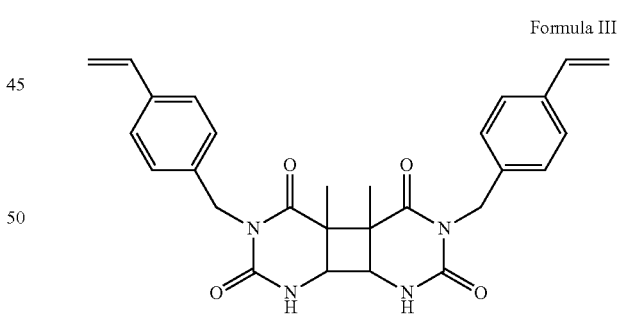

Formula III

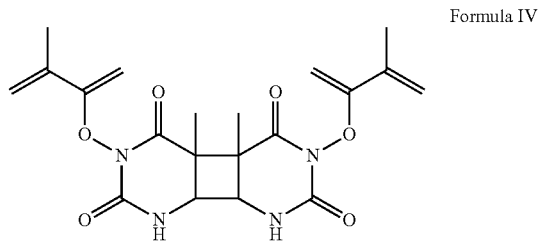

Formula IV

-continued

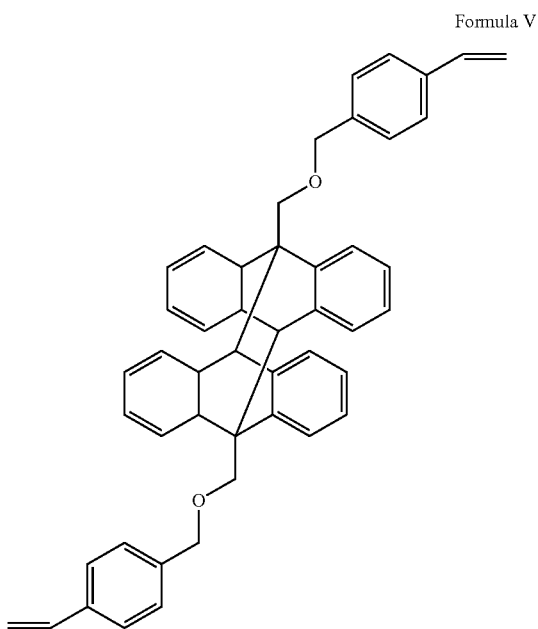

Formula V

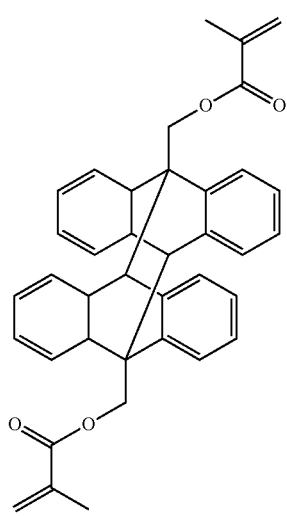

Formula VI

In some embodiments, the cross-linking agent is a molecule having a structure of Formula I:

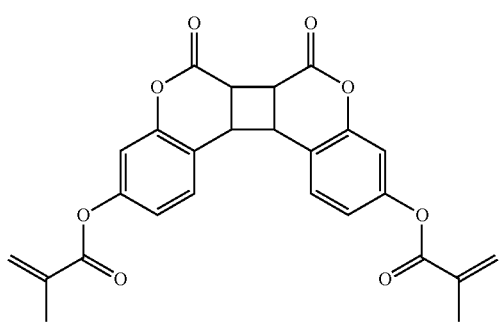

Formula I

Coating Compositions

The cross-linking agent may be present in the coating composition in an amount of less than 15 mol % of the total of the monomer and cross-linking agent. In some embodiments, the cross-linking agent is present in the coating composition in an amount of less than 12 mol %, or less than 10 mol %, or less than 8 mol %, or less than 6 mol %, or less than 5 mol %, or less than 4 mol % of the total of the monomer and cross-linking agent.

The coating composition is intended for forming a coating that at least partially mobilises in response to UV light. In a coating that is at least partially mobilised, polymer chain segments within the coating are mobile, so that at least a portion of the coating, such as a portion at the surface, is susceptible to reconfiguration or reconstruction. For example, the at least partially mobilised coating may reconfigure when mobilised polymer flows into a surface defect to reduce the surface energy. It is therefore important that the extent of cross-linking should not be so high that the polymer chains remain immobilised despite extensive breaking of cross-links during a UV-light treatment. Relatively higher amounts of cross-linking agent in the composition will result in harder coatings, which may be more resistant to scratching but which are relatively more challenging to mobilise upon irradiation by UV-light, as a greater number of cross-links must be cleaved to mobilise the polymer chain segments. Conversely, relatively lower amounts of cross-linking agent in the composition may result in less durable or more scratch-susceptible coatings, but which are relatively easier to mobilise upon irradiation by UV-light. A skilled person, with the benefit of this disclosure, will be able to routinely determine the optimal amount of UV-scissionable cross-linker to add to the coating composition for a given coating application.

The coating composition may further comprise a radical polymerisation initiator. Suitable initiators may include any initiators conventionally used to initate radical polymerisation of acrylate and methacrylates monomers for coating applications. An example of a suitable initiator is azobisisobutyronitrile (AIBN). The initiator may be added in an amount of less than 5 mol % relative to the monomers, such as below 2 mol %, or about 1 mol %. The initiator may be added to the composition at any time before, or at the time of, applying the coating to the substrate to be coated. Preferably, the initiator, if included, is added into the coating composition just before application of the composition to the substrate. The coating composition may optionally comprise a photosensitiser, such as benzophenone. Preferably, the composition is well-mixed before application to the substrate.

The coating composition may further comprise a solvent or diluent. In some embodiments, the solvent or diluent is water or another aqueous liquid. In some embodiments, the solvent or diluent is an organic solvent. In other embodiments, the coating composition, as applied to the substrate to be coated, is not diluted but is applied as a bulk phase composition. This may advantageously avoid the necessity of additional processing steps to remove the diluent, as well as reducing hazards and environmental impacts associated with volatile solvents. The coating composition may further comprise other additives conventionally used for acrylate coating compositions, including particulate materials. Suitable particulate materials may include silica, titania, ceramic, metal organic framework, calcium carbonate and metallic particles, including nanosized particles.

Process for Coating a Substrate

The present invention also relates to a process for coating a substrate with a coating that at least partially mobilises in response to UV light. The process comprises providing a substrate to be coated, a monomer selected from acrylates, methacrylates and mixtures thereof and a cross-linking agent comprising two sub-units covalently bonded together, each sub-unit comprising an unsaturated group which is co-polymerisable with the monomer, wherein the two sub-units are adapted to dissociate in response to irradiation by UV light. The substrate is contacted with the monomer and the cross-linking agent, and polymerisation of the monomer and the cross-linking agent is induced. The cross-linking agent contacted with the substrate may in an amount of less than 15 mol % of the total of the monomer and cross-linking agent contacted with the substrate.

The substrate may be any substrate to which an acrylate polymer coating is conventionally applied. For example, the process may be used to coat inorganic, organic, polymeric or metallic surfaces. In some embodiments, the process may be used to coat glass substrates, for example windscreens or lenses. In some embodiments, the process may be used to coat metallic substrates, for example vehicle panels. In some embodiments, the process may be used to coat ceramic or polymeric substrates, for example biomedical devices.

The monomer, the cross-linking agent and any initiators, photosensitisers, diluents or further additives employed in the process may include any of the embodiments described herein. The cross-linking agent may be applied to the substrate in an amount of less than 15 mol %, or less than 12 mol %, or less than 10 mol %, or less than 8 mol %, or less than 6 mol %, or less than 5 mol %, or less than 4 mol % of the total of the monomer and cross-linking agent applied to the substrate.

In some embodiments, the monomer and the cross-linking agent are combined in a coating composition before application to the substrate. In other embodiments, the monomer and the cross-linking agent are applied separately, combining and mixing on the substrate surface such that the monomer and the cross-linking agent are able to co-polymerise when polymerisation is induced.

The monomer and the cross-linking agent may be applied to the substrate, and polymerisation subsequently induced, using any techniques and process equipment conventionally used for applying acrylate coatings to substrates. In some embodiments, the monomer and the cross-linking agent are applied to a substrate in a pre-existing process, so that the invention may be implemented without the need for new process equipment or substantial re-optimisation of the pre-existing coating process parameters.

Polymerisation of the monomer and the cross-linking agent may be induced by any conventional means. In some embodiments, a radical polymerisation initiator is applied to the substrate, typically pre-mixed into the monomer, the cross-linking agent, or the coating composition comprising the two. The step of inducing polymerisation may comprise heating the coated substrate. In some embodiments, the coated substrate is heated to above 40° C., or above 50° C., or above 60° C., or above 70° C., or about 80° C. to induce polymerisation.

Once polymerisation is initiated, the coating may be maintained under polymerisation/curing conditions (such as elevated temperature) for a sufficient time, for example at least one hour, or at least two hours, or at least five hours, or at least 10 hours, or at least 20 hours, to allow polymerisation to reach the required degree of curing. Other process treatments conventionally used to cure or otherwise finish acrylate coatings may also be performed. As will be appreciated by a person skilled in the art, the molecular weight of the main chains in acrylate polymers may be influenced by controlling various parameters during the polymerisation/curing process. These include, among others, the choice and amount of initiator, and the temperature and duration of curing at elevated temperatures. Higher main chain molecular weights may render the chain segments less mobile. Thus, for relatively higher molecular weight polymers, a lower amount of cross-linking agent may in some embodiments be preferred, to achieve the required coating properties, both before and after UV irradiation. Alternatively, in some embodiments, a higher temperature during UV irradiation may be required to mobilise higher molecular weight coatings than is required for lower molecular weight coatings comprising the same amount of cross-linking agent. A person skilled in the art, with the benefit of this disclosure, would be able to routinely optimise the disclosed process to achieve a desirable molecular weight for a given application.

Because the cross-linking agents are provided in the process of the invention, and co-polymerised together with the monomers, the process advantageously does not require a separate cross-linking process step, conducted after polymerising the monomers, to establish a UV-scissionable cross-linking network.

Coatings

The present invention also relates to coatings formed by applying a coating composition, according to any one of the embodiments described herein, to a substrate, and inducing polymerisation of the coating composition. Furthermore, the present invention also relates to coatings prepared by a process according to any of the embodiments described herein.

The coatings of the present invention at least partially mobilise in response to irradiation by UV light, due to photo-induced dissociation of the sub-units in the cross-linking groups. As the cross-linking groups are cleaved, the glass transition temperature ($T_g$) of the polymer in the region of the defect decreases, and the polymer chains become increasingly mobile. In some embodiments, the coating initially has a $T_g$ of at least 45° C., or at least 50° C., or at least 55° C., or at least 60° C., such as from 45° C. to 75° C., and the $T_g$ is reduced by at least 5° C., or at least 10° C., or at least 20° C., as the cross-links are cleaved upon irradiation by the UV light. In some such embodiments, the $T_g$ after irradiation with UV light is sufficiently low that the coating is mobilised at low temperature conditions, such as from 10° C. to 60° C., or from 15° C. to 40° C., or from 20° C. to 30° C., or at ambient temperature conditions (i.e. without the need for heating the coating). Such embodiments may be useful for applications (such as automotive or lens coatings) where the coating is generally intended for use at ambient temperature conditions, and are not required to withstand high temperature conditions.

In some embodiments, the coating initially has a $T_g$ of at least 90° C., or at least 100° C., or at least 110° C., or at least 120° C., and the $T_g$ is reduced by at least 10° C., or at least 20° C., or at least 30° C., as the cross-links are cleaved upon irradiation by the UV light. Such embodiments may be useful for applications where the coating is required to withstand high temperatures, such as for example surgical or other medical devices that must withstand sterilisation conditions. In these embodiments, elevation of the temperature of the coating, for example to above the $T_g$ of the photo-cleaved polymer, may be required to assist in mobilising the de-cross-linked polymer chains enough that the coating is mobilised.

A person skilled in the art, with the benefit of this disclosure, will be able to prepare a coating suitable for applications having a specific operational temperature range. For example, higher $T_g$ coatings (such as for high temperature applications) may be prepared by increasing the main chain molecular weight of the polymer, using standard control techniques for acrylate coatings, and/or by increasing the amount of cross-linking agent in the coating, and/or by appropriate monomer selection.

The coatings of the present invention may provide one or more of a number of characteristics which may be advantageous in certain applications. In some embodiments, a surface defect in the coating, for example a crack or a scratch, is treatable by irradiating the coating with UV light to at least partially mobilise the coating. Provided that the initial extent of cross-linking after polymerisation is not too high, and sufficient photo-scission reactions are induced under UV irradiation, the polymer is able to flow into the defect site. This "healing" process is driven by the resulting decrease in the surface area, and thus the surface energy, of the system. As a result of the polymer flow into the defect, the functional or aesthetic integrity of the coating may be restored, or at least improved.

Treatment of a defect in the coating involves irradiation of the coating, at least in the region of the defect, with UV-light of a suitable wavelength to induce the sub-units in the cross-linking agent to dissociate. As will be apparent to a person skilled in the art, the extent of photo-scission reaction in the coating will be increased by irradiating the coating with a higher dosage of UV light, for example by irradiating the coating with a higher intensity source of UV light and/or for longer time periods. In some embodiments, the surface defect is treated with a dosage of UV light of at least 5 J·cm$^{-2}$, or at least 10 J·cm$^{-2}$, at least 15 J·cm$^{-2}$. In some embodiments, the coating may be irradiated for at least 10 minutes, or at least one hour, or at least 5 hours, or at least 10 hours, or at least 20 hours. In some embodiments, the surface defect is treated with UV light at an elevated temperature, i.e. above the $T_g$ of the polymer in its de-cross-linked form. In some embodiments, the temperature is elevated above 30° C., or above 40° C., or above 50° C., or above 60° C., or above 70° C., or above 80° C., or above 100° C., or above 110° C. or above 120° C. during the healing process. In general, coatings with higher $T_g$ values prior to irradiation by UV light should be heated to a higher temperature to achieve mobilisation when irradiated by UV light.

In some embodiments, the polymer chains mobilised in the coating under irradiation by UV light are subsequently stimulated, or allowed, to re-form the initial covalently bonded cross-links. This may advantageously result in one or more of the original properties of the coating, such as the $T_g$, hardness or rigidity being at least partially restored. Restoration of the cross-linking network may be particularly desirable after treating a surface defect in a polymer coating, so that the healed coating is again immobilised and substantially, or at least partially, regains the initial properties of the virgin coating.

In embodiments where the sub-units of the cross-linking agents are adapted to dissociate by a photo-induced cycloelimination reaction, such as a [2π+π2] cycloelimination or a [4π+π4] cycloelimination reaction, cleaved cross-links in the mobilised polymer may be re-formed by the corresponding cycloaddition reactions. As discussed herein, such cycloaddition reactions may be induced by irradiation of the coating with a higher wavelength UV light than the UV light which induces the cycloelimination reaction. In some embodiments, cross-linking in the mobilised polymer coating may be at least partially restored under irradiation by UV light with a wavelength of wavelength of 300 nm and above, for example above 330 nm, or from 340 to 370 nm, such as about 350 nm or 366 nm. In some embodiments, the coating in the region around the healed defect is irradiated with UV light with a wavelength above 300 nm to immobilise the coating in the region around the defect.

Other applications of the coatings of the invention are also envisaged. The coatings may be useful in applications where degradation of the coating is required, for example so that the coating may be removed from the substrate. This would allow the substrate to be re-coated with a virgin coating layer, whether prepared with the coating compositions or processes of the present invention or not. As will be apparent to a person skilled in the art, the coatings of the present invention, when mobilised under irradiation by UV light, may be more readily removed from a substrate than a conventionally cross-linked coating, for example by dissolution or mechanical methods.

The acrylate coatings of the present invention may also possess other characteristics not previously available. Notably, the virgin coatings produced by co-polymerising the monomers and the cross-linking agents do not contain, or do not contain a substantial amount of, unreacted pendant cross-linkable functionalities (i.e. the functionalities produced by dissociation of the cross-linking agent sub-units in response to UV light). In some embodiments, the unreacted pendant cross-linkable functionalities are present in the virgin coating in an amount of less than 10 mol %, or less than 5 mol %, or less than 2 mol %, or less than 1 mol %, or none, relative to the amount of cross-linking groups in the polymer. This efficient use of cross-linkable functionalities means that the required degree of cross-linking in the virgin coating may be achieved with a relatively low amount of cross-linking agent. In this regard, the coatings may be compositionally similar to conventionally cross-linked coatings, i.e. coatings cross-linked with non-cleavable cross-linking agents. Furthermore, the absence, or substantial absence, of pendant cross-linkable functionalities in the virgin coating may be preferred for functional reasons.

By contrast, formation of UV-cleavable cross-links after polymerising the monomer, as required for coatings produced from coating compositions comprising (meth)acrylate monomers and co-monomers with cross-linkable functionalities (but no pre-formed UV-cleavable cross-linking agents), is relatively inefficient. As the post-polymerisation cross-linking reaction proceeds, for example in response to UV irradiation with wavelengths of 300 nm or above, the polymer chains in the coating become increasingly immobilised. The unreacted pendant cross-linkable functionalities are thus increasingly hindered, and ultimately prevented, from coming into close enough proximity to react. Thus, an inefficiently high amount of the cross-linkable functionalities must be included in the coating composition to achieve the desired extent of cross-linking in the virgin coating. Furthermore, the unreacted functionalities remaining in the coating may unfavourably impact its properties relative to a conventionally cross-linked (and thus non-self-healing) polymer.

Thus, the invention also relates to coatings that at least partially mobilise in response to UV light, comprising a polymer comprising (i.e. prepared by polymerisation of) a monomer selected from acrylates, methacrylates and mixtures thereof and cross-linked by cross-linking groups, wherein the cross-linking groups comprise two sub-units covalently bonded together and adapted to dissociate by a cycloelimination reaction in response to irradiation by UV light to form pendant unsaturated groups, wherein the polymer, prior to irradiation by the UV light, comprises less than 5 mol %, preferably less than 2 mol %, most preferably none of the pendant unsaturated groups relative to the cross-linking groups. The cross-linking groups may be present in the polymer in an amount of less than 15 mol %, preferably less than 10 mol %, preferably less than 5 mol %, of the total of the monomer and cross-linking groups.

As will be appreciated by a person skilled in the art, the cross-linking groups in this coating are the same as the cross-linking groups in coatings produced from the coating compositions, and by the processes, disclosed herein, for embodiments wherein the two sub-units in the cross-linking agent are adapted to dissociate by a cycloelimination reaction in response to irradiation by UV light.

As will also be appreciated by a person skilled in the art, the pendant unsaturated groups formed by irradiation with UV light of this coating are the same as the groups formed when the sub-units are dissociated in response to UV light in coatings produced from the coating compositions, and by the processes, disclosed herein, for embodiments wherein the two sub-units in the cross-linking agent are adapted to dissociate by a cycloelimination reaction in response to irradiation by UV light.

EXAMPLES

The present invention is described with reference to the following examples. It is to be understood that the examples are illustrative of and not limiting to the invention described herein.

Materials

7-Hydroxy coumarin, n-butylmethacrylate (BMA), methyl acrylate (MA), hexyl methacrylate (HMA), ethyl acrylate (EA) and acetic anhydride were supplied from Sigma-Aldrich. Methacryloyl chloride was obtained from Fluka. All other reagents were purchased from Merck. All the chemicals were used without further purifications.

Example 1. Synthesis of 7-methacryloyloxycoumarin Dimer

7-Methacryloyloxycoumarin dimer was prepared according to the synthetic route depicted in Scheme 4.

Scheme 4

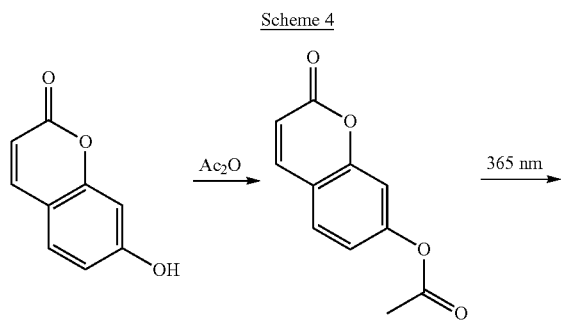

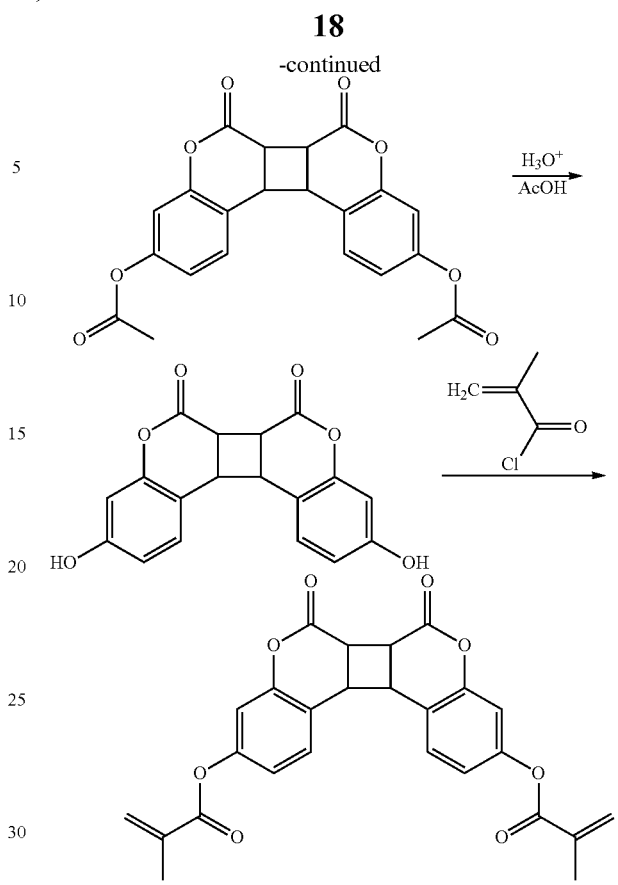

7-Hydroxycoumarin (10 g, 61.7 mmole) and sodium acetate (7.6 g, 92.6 mmole) were dissolved in 36 ml of acetic anhydride in a 250 ml round bottom flask. A few drops of pyridine were added to the reaction mixture. The mixture was heated slowly to 144° C. to get a clear solution. The reaction was held at this temperature to reflux overnight. The solution was cooled to room temperature and the resulting precipitate was collected by filtration and washed with iced water and ethanol. The precipitate was recrystallized twice in ethanol to obtain needle crystals of 7-acetoxycoumarin. The crystals were collected by filtration and dried for 24 h in a vacuum oven. Yield=68%, M.p=142-144° C., $^1$H-NMR (400 MHz, CDCl$_3$): δ 2.34 (s, 3H, CH$_3$CO), δ 6.38-6.4 (d, 1H, J=9.6 Hz), δ 7.03-7.11 (m, 2H), δ 7.46-7.49 (d, 1H, J=8.4 Hz), δ 7.66-7.69 (d, 1H, J=9.6 Hz). $^{13}$C-NMR (400 MHz, CDCl$_3$): δb 21.1 (CH$_3$), 110.46 (C8), 116.12 (C3), 116.68 (C6), 118.4 (C4C), 128.55 (C5), 142.81 (C4), 153.18 (C7), 154.71 (C8C), 160.32 (C2), 168.69 (C=O, acetate) IR: 3081 m, 2945 m, 1736 s, 1618 s, 1565 m, 1506 m, 1426 m, 1399 s, 1369 s, 1267 s, 1203 m, 1183 m, 1119 s, 1010 s, 987 m, 904 s, 848 s, 725 s.

7-Acetoxycoumarin (7 g, 17.14 mmole) was dissolved in 200 ml of ethyl acetate. Benzophenone (1.25 g) was then added to the solution as a photosensitizer. The reaction mixture was transferred to quartz cells (3.5 ml). A total of 6 quartz cells were irradiated in an ice bath at 365 nm using UV light for a total of 36 h. The solid formed in the quartz cells was collected by filtration and washed with diethyl ether. Additional solid was collected by evaporating the ethyl acetate from the filtrate. The combined solids were then recrystallized from acetic acid. The white crystals of 7-acetoxycoumarin dimer were collected by filtration and dried overnight in a vacuum oven. Yield=54.61%, Mp=230-232° C. MS (ESI)+: Calcd for C$_{22}$H$_{16}$O$_8$: 408.36; Found:

431.073 (M+Na)+. $^1$H-NMR (400 MHz, DMSO-d$_6$): δ2.30 (s, 6H), δ3.92 (d, 1H), δ3.97 (d, 1H), δ6.98-7.02 (m, 4H), δ7.41 (d, 2H). $^{13}$C-NMR (400 MHz, DMSO-d$_6$): δc21.07 (CH$_3$, acetate), 40.08 (C3), 43.50 (C4), 111.64 (C8), 117.64 (C6), 118.89 (C5), 128.38 (C4C), 151.27 (C8C), 165.54 (C7), 169.04 (C=O, acetate). IR: 2964 s, 2910 s, 1751 s, 1590 m, 1502 s, 1427 s, 1366 s, 1306 m, 1260 m, 1198 m, 1142 s, 1106 s, 973 m, 908 s, 863 m.

7-Acetoxycoumarin dimer (1.5 g, 3.67 mmole) was suspended in a solvent mixture containing 30 ml of 4N hydrochloric acid and 30 ml of ethanol. The suspended solution was then heated to 75° C. to obtain a clear solution, and then refluxed for 6 h while purging with nitrogen. Following this, the solution was left to cool to room temperature, and 40 ml of water was added. This solution was extracted 3 times with 40 ml of ethyl acetate. The organic layer was separated and the volatiles removed on a rotary evaporator. Acetic acid (10 ml) was then added to the residue and refluxed over night at 118° C. The solution was then cooled to room temperature and the resultant pale yellow precipitate was collected by filtration and washed with diethyl ether. The 7-hydroxycoumain dimer solid was dried overnight in a vacuum oven. Yield=68%, mp=251-253° C. MS (ESI)+: Calcd for C$_8$H$_{10}$N$_2$O$_3$: 324.29; Found: 347.052 (M+Na)+. $^1$H-NMR (400 MHz, DMSO-d$_6$): δ3.61-3.83 (dd, 4H, J$_1$=8.0 Hz, J$_2$=7.6 Hz), δ6.45-6.64 (m, 2H, J=2.4 Hz), δ7.11 (d, 2H, J=8.4 Hz), δ9.8 (s, 2H). $^{13}$C-NMR (400 MHz, DMSO-d$_6$): δc 39.23 (C3), 42.81 (C4), 103.78 (C8), 112.19 (C6), 113.08 (C4C), 129.79 (C5), 151.70 (C8C), 158.36 (C7), 166.44 (C2). IR: 3312 s, 3080 m, 2971 m, 1735 s, 1628 s, 1510 s, 1452 s, 1334 s, 1276 s, 1188 s, 1146 s, 989 s, 947 m, 870 s, 814.

7-Hydroxycoumarin dimer (0.2 g, 0.62 mmol) was dissolved in N,N-dimethylacetamide. The clear solution was placed in an ice bath. 10 equivalents of triethylamine (0.86 ml, 6.2 mmol) were added to the solution. Subsequently, methacryloyl chloride (0.15 ml) was dropwise added to the solution. After 15 min, the ice bath was removed and the mixture was left overnight to stir at room temperature. Methanol was added to the reaction mixture to quench the excess methacryloyl chloride. The by-product and methanol were removed by evaporation under reduced pressure, and the ammonium salt was filtered off. The filtrate was poured into deionized water (250 ml), resulting in formation of a precipitate which was collected and dried. The solid was dissolved in chloroform and poured into 150 ml of n-hexane to again precipitate a solid. The 7-methacryloyloxycoumarin dimer solid was filtered off and overnight dried in vacuum oven. Yield=57.19%, MS (ESI)+: Calcd for C$_{26}$H$_{20}$O$_8$: 460.44; Found: 461.123 (M+H)+. $^1$H-NMR (400 MHz, CDCl$_3$): δ (ppm) 2.11 (s, 6H), 3.97 (d, 2H, J=8.9 Hz), 4.89 (d, 2H, J=8.9 Hz), 5.70 (m, 2H), 6.28 (m, 2H), 6.52 (dd, 2H, J1=8.3 Hz, J2=2.3 Hz), 6.65 (d, 2H, J=2.3 Hz), 7.07 (d, 2H, J=8.3 Hz). IR: 1727 s, 1605 s, 1513 m, 1429 s, 1376 w, 1278 m, 1156 m, 1125 m, 1034 s, 974 s, 886 w.

Example 2. Polymerisation of Coating Compositions

Coating compositions were prepared by mixing 7-methacryloyloxycoumarin dimer with different acrylate monomers in ratios of 1, 3 and 5 mol % dimer relative to monomer. Compositions were prepared with n-butylmethacrylate (BMA), methylacrylate (MA), n-hexyl methacrylate (HMA) and ethyl acrylate (EA) in different mole ratios (1, 3 and 5 mol % of 7-methacryloyloxycoumarin dimer relative to monomer), to give a total of 12 different coating compositions.

Azobisisobutyronitrile (AIBN) was then added as an initiator to the coating compositions in an amount of 1 mol %. The coating compositions were poured as a thin film (less than 1 mm thickness) onto a glass slide. The film-coated slides were then heated to 80° C., thus inducing polymerisation, and maintained at 80° C. for 24 hours. The polymerisation reaction is schematically depicted in Scheme 5.

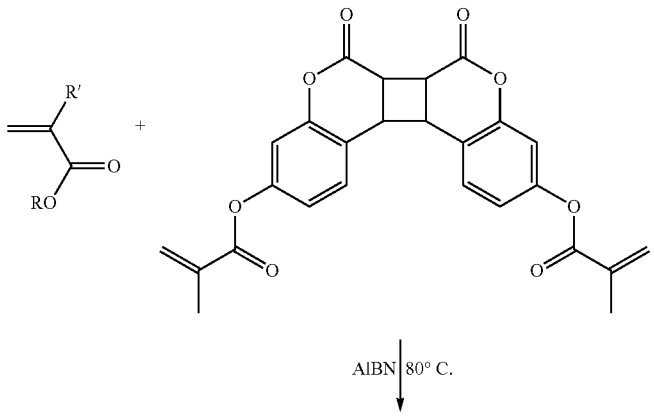

-continued

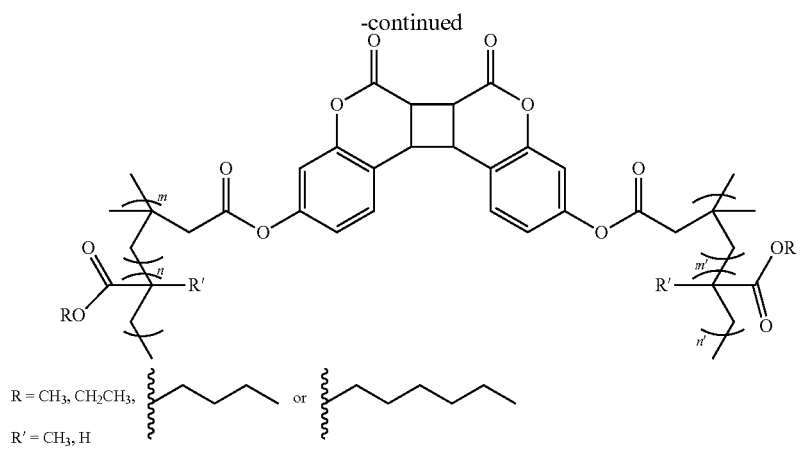

R = CH₃, CH₂CH₃,

R' = CH₃, H

The progress of the polymerisation reactions in the coatings was monitored by AT-IR spectroscopy using an Agilent Cary 630 spectrophotometer (32 scans at a resolution of 4 cm$^{-1}$). The coumarin vinyl absorption peak at 970 cm$^{-1}$ was used to monitor the reaction at different time intervals (0 to 84 hrs). The peak at 1724 cm$^{-1}$, attributable to the non-reacting C=O group of coumarin, was used as an internal standard. The reduction ratio was calculated according to the formula:

Reduction ratio=([C=C]$_t$/[C=O]$_t$)/([C=C]$_{t0}$/[C=O]$_{t0}$)

where [C=C]$_{t0}$ and [C=C]$_t$ are the peak height of the vinyl absorption peak at 970 cm$^{-1}$ at time 0 and t, respectively, and [C=O]$_{t0}$ and [C=O]$_t$ are the peak height of the C=O absorption peak at 1724 cm$^{-1}$ at time 0 and t, respectively.

As the reaction time increased, significant decrease in the reduction ratio was observed, indicating polymerisation of the vinyl groups. For all of the coating compositions, the majority of the reaction occurred in the first 20-30 h, and the polymerisation reaction was largely complete after 40-50 hrs. As a representative example, FIG. 1 depicts a graph of the reduction ratio versus time during polymerisation of the coating composition comprising BMA and 3 mol % of 7-methacryloyloxycoumarin dimer.

Example 3. UV-Light Induced Photo-Cleavage and Photo-Dimerisation in Coatings, Monitored by IR-Spectroscopy The 12 coatings, as produced in example 2, were then subjected to irradiation (of up to 25 J·cm$^{-2}$) using a CL1000M UV-crosslinker lamp (UVP, LLC) that provided polychromatic light centred at 254 nm. After completing the step of irradiating the coating at 254 nm, the coating was again irradiated using the CL1000M UV-crosslinker lamp (UVP, LLC), but now under polychromatic light centred at 365 nm.

Figure 2:
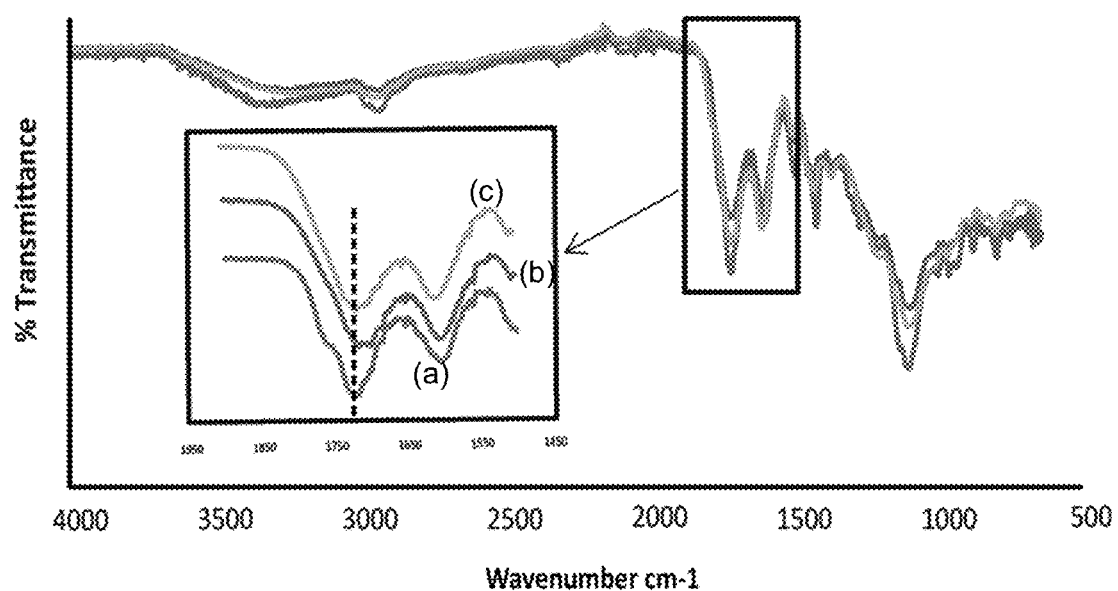
FIG. 2 depicts AT-IR spectra of a polymerised coating composition comprising BMA and 5 mol % of 7-methacryloyloxycoumarin dimer taken before irradiation (a), after irradiation at 254 nm (b), and again after irradiation at 365 nm (c).

The amount of coumarin dimer (cycloaddition product) versus coumarin monomer (cycloelimination product) in the polymer coating before, between and after the irradiation steps was monitored by IR spectroscopic analysis. A clear marker for this analysis was provided by the coumarin C=O stretching mode at 1724 cm$^{-1}$ in the virgin coating. This peak decreased and split into two peaks at 1702 and 1716 cm$^{-1}$ upon irradiation with 254 nm UV light. The subsequent irradiation at 365 nm caused re-formation of a single peak at higher frequency (1719 cm$^{-1}$). FIG. 2 depicts the changes in the AT-IR spectra of a polymerised coating composition comprising BMA and 5 mol % of 7-methacryloyloxycoumarin dimer in response to the irradiation steps.

The height of the peak at 1377 cm$^{-1}$ was used as a non-changing, internal standard. The change in peak height (CPH) was thus calculated according to the formula:

CPH=([C=O]$_t$/[CH$_3$]$_t$)/([C=O]$_{t0}$/[CH$_3$]$_{t0}$)

where [C=O]$_{t0}$ and [C=O]$_t$ are the peak height of the C=O stretching peak at 1724 cm$^{-1}$ at time 0 and t, respectively, and [CH$_3$]$_{t0}$ and [CH$_3$]$_t$ are the peak height internal standard peak at 1377 cm$^{-1}$ at time 0 and t, respectively. The change in the numerical value of the CPH thus represents the change in the opening and closing of the coumarin-based cross-linker, with a reduction in the value of CPH corresponding with increasing cycloelimination of the cyclobutane ring in the coumarin dimer.

Figure 3:
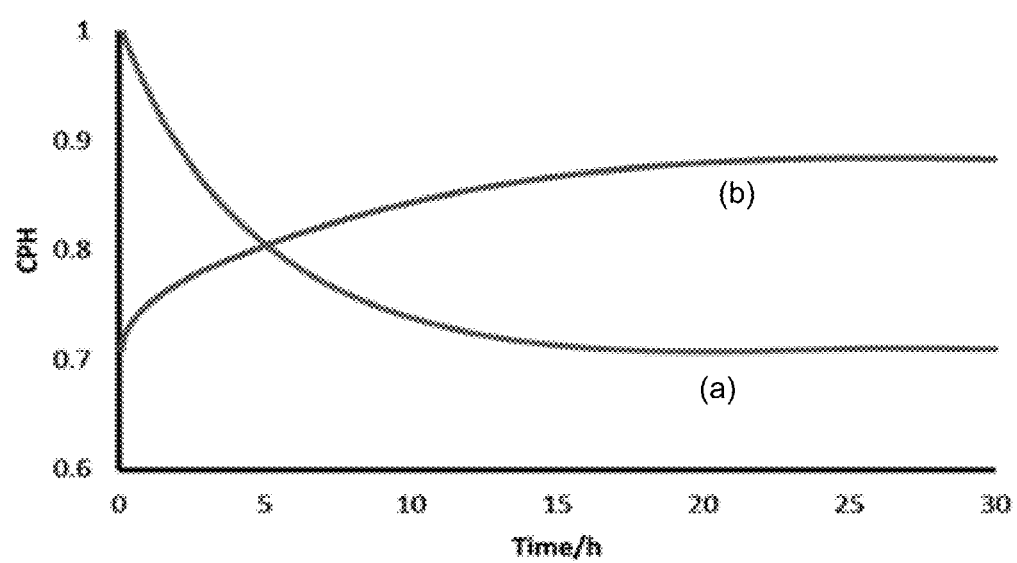
FIG. 3 is a graph showing change in peak height (CPH) at 1719 cm$^{-1}$ of a polymerised coating comprising BMA and 5 mol % of 7-methacryloyloxycoumarin dimer during irradiation at 254 nm (a); and subsequently during irradiation at 365 nm (b).

For all of the polymer compositions, CPH decreased markedly in response to irradiation at 254 nm, and was substantially restored in response to irradiation at 365 nm. In FIG. 3, as a representative example, the CPH of the polymerised coating composition comprising BMA and 5 mol % of 7-methacryloyloxycoumarin dimer is shown. The dimer cleavage reaction decreases rapidly upon irradiation at 254 nm (UV dosage of 11.7 J·cm$^{-2}$), reaching a plateau after about 14 hours. After commencing irradiation at 365 nm (UV dosage of 17.5 J·cm$^{-2}$), CPH initially increases rapidly, and reaches its maximum value at around 21 hours.

The initial CPH is substantially, but not completely, recovered after the two irradiation steps. Not all of the decoupled coumarin groups can be re-coupled by photocycloaddition to form cyclobutane rings. Without wishing to be bound by any theory, this may be due to mobilisation of the de-cross-linked polymeric chains. As a result, not all of the free coumarin moieties are able to adopt the required proximity and/or orientation (parallel position and 3.5-4 Å distance) to other free coumarin moieties for the 2π+2π cycloaddition reaction to take place.

Example 4. UV-Light Induced Photo-Cleavage and Photo-Dimerisation in Coatings, Monitored by UV-Spectroscopy Four coating compositions were prepared by combining 7-methacryloyloxycoumarin dimer and 1 mol % AIBN with different acrylate monomers (BMA, MA, HMA and EA) in chloroform. The compositions had a concentration of 0.1M of the monomers and cross-linking agent in chloroform and a ratio of 5 mol % 7-methacryloyloxycoumarin dimer relative to monomer.

The coating compositions were spin-coated onto a 1 cm diameter quartz cell. Polymerisation was induced by heating the coating to 80° C. as in Example 2. The coating thicknesses, as measured using a Veeco Dektak 150 Surface Porfilometer, ranged from 200 to 300 nm. The coatings were then subjected to successive irradiations with UV light, at 254 nm (total dosage of 11.65 J/cm$^2$) and then 365 nm (total dosage of 25.5 J/cm$^2$), using the procedure described in Example 3.

Figure 4A:
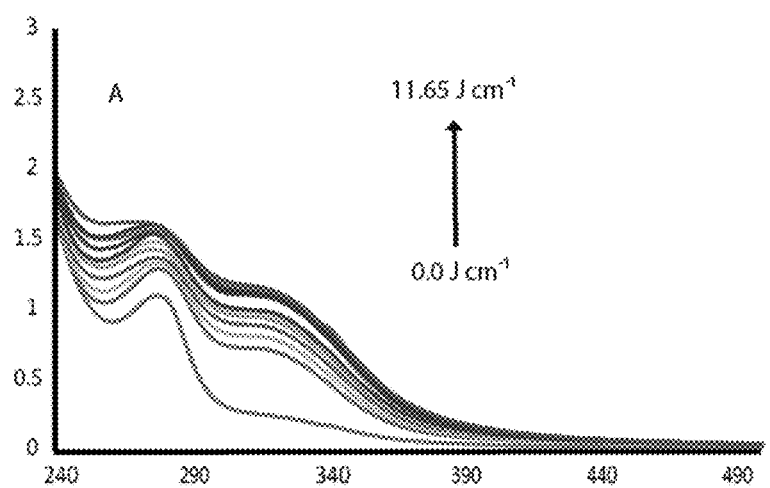
FIG. 4A depicts UV-vis spectra of a polymerised coating composition comprising n-butylmethacrylate and 5 mol % of 7-methacryloyloxycoumarin dimer during irradiation at 254 nm.
Figure 4B:
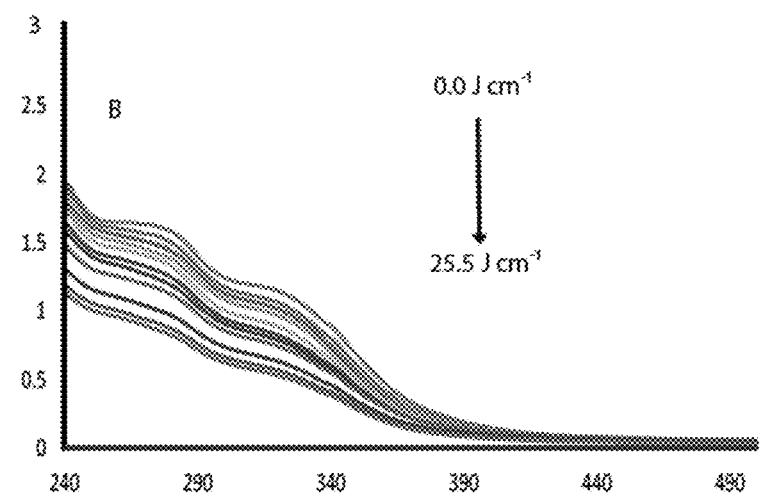
FIG. 4B depicts the subsequent UV-vis spectra during irradiation at 365 nm.

UV-Vis spectra of the coatings were recorded on a Hitachi U1800 spectrophotometer. As an example, FIGS. 4A and 4B depict successive UV-vis spectra at intervals during the 254 nm irradiation step and during the subsequent 365 nm irradiation step, for the BMA-based coating respectively. A characteristic coumarin absorption band appears between 310-340 nm for the $\pi$-$\pi$* transitions attributed to the double bond in the coumarin's benzopyrone ring. No such absorption is apparent in the virgin coatings, because the coumarin was fully dimerized before incorporation within the polymer chain. Once the coatings were irradiated with 254 nm light, a peak at 320 nm starts to appear, indicating cleavage of the cyclobutane rings in the cross-linkers to form pendant coumarin moieties (FIG. 4A). Upon exposure to 365 nm light, this absorption peak decreases, but is not completely eliminated (FIG. 4B). This indicates that cross-linking in the polymer is partially restored by photo-dimerisation of the coumarin moieties.

Example 5. Mechanical Testing of Polymer Subjected to Photo-Cleavage and Photo-Dimerisation Four coating compositions were prepared by combining 7-methacryloyloxycoumarin dimer and 1 mol % AIBN with different acrylate monomers (BMA, MA, HMA and EA). The compositions had a ratio of 3 mol % 7-methacryloyloxycoumarin dimer relative to monomer. The compositions were then placed in a specimen mould, and polymerisation was induced by heating the compositions to 80° C. for 48 hours. After curing, the 1.5-2 mm thick specimens were successively irradiated with 254 nm UV light (total dosage of 41.6 J·cm$^{-2}$) and 365 nm UV light (total dosage of 66.6 J·cm$^{-2}$) using the CL1000M UV-crosslinker lamp.

The specimens were subjected to Dynamic Mechanical Analysis (DMA) with a Perkin Elmer Dynamic Mechanical Analyser DMA7 using a penetration mode and helium gas (35 cm$^3$ min$^{-1}$). The static force was 800 mN, the dynamic force was 500 mN and the frequency was 1 Hz. The glass transition temperature ($T_g$) of the specimens before, between and after the two irradiation steps is shown it Table 1.

TABLE 1

| | Glass transition temperatures of specimens (3 mol % coumarin dimer) | | |
|---|---|---|---|
| Monomer | $T_g$ of virgin specimen (° C.) | $T_g$ after irradiation at 254 nm (° C.) | $T_g$ after irradiation at 365 nm (° C.) |
| BMA | 70.3 | 52.1 | 66.8 |
| MA | 64.5 | 49.5 | 61.5 |
| HMA | 45.5 | 42.5 | 43.5 |
| EA | n.d. | 31.5 | 35.2 |

As may be seen in Table 1, irradiation of the virgin specimens with 254 nm UV light caused a substantial decrease in $T_g$ for all the polymer compositions. The initial $T_g$ could be substantially restored upon subsequent irradiation with 365 nm UV light.

The four coating compositions were also poured onto glass substrates. The film-coated substrates were then heated to 80° C., thus inducing polymerisation, and maintained at 80° C. for 24 hours. After curing, the specimens were successively irradiated with 254 nm UV light (total dosage of 11.7 J·cm$^{-2}$) and 365 nm UV light (total dosage of 25.5 J·cm$^{-2}$) using the CL1000M UV-crosslinker lamp.

The mechanical properties of the coatings were then analysed using a Duramin A-300 Hardness Tester before, between and after the two irradiation steps. A pyramidal diamond was applied to the surface of the composite under a load of 0.25 kg for 15 s. The indentation diagonal length was measured through a microscope with objective lens (100× magnifications) and measured for 3 times. The microhardness values are shown in Table 2.

TABLE 2

| | Vicker hardness of coatings (3 mol % coumarin dimer) | | |
|---|---|---|---|
| Monomer | Vicker hardness of the virgin coating (mPa) | Vicker hardness after irradiation at 254 nm (mPa) | Vicker hardness after irradiation at 365 nm (mPa) |
| BMA | 60.3 | 49.7 | 55.3 |
| MA | 57.3 | 50.1 | 53.4 |
| HMA | 52.7 | 47.3 | 49.1 |
| EA | 49.5 | 43.4 | 44.9 |

As may be seen in Table 2, the virgin coatings had the highest hardness values. Irradiation of the virgin coatings with 254 nm UV light caused a substantial decrease in hardness for all the polymer compositions. The initial hardness could be substantially, but not completely restored upon subsequent irradiation with 365 nm UV light.

Example 6. Self-Healing of Coatings Upon Irradiation with UV Light

Four coating compositions were prepared by combining 7-methacryloyloxycoumarin dimer and 1 mol % AIBN with different acrylate monomers (BMA, MA, HMA and EA). The compositions had a ratio of 3 mol % 7-methacryloyloxycoumarin dimer relative to monomer. The coating compositions were poured as a film onto a glass substrate, heated to 80° C., thus inducing polymerisation, and maintained at 80° C. for 24 hours.

A razor blade was used to make a scratch on the surface of the polymeric coatings. The defects generally had an average width of approximately 40 micrometres. The film was then irradiated with a dosage of 11.66 J cm$^{-2}$ of UV light at 254 nm to stimulate the photo cleavage process. The BMA, MA and HMA-based coatings were heated to above their glass transition temperatures during irradiation, while the EA-based coating was irradiated at room temperature. After the photo-cleavage irradiation step, the coatings were irradiated with a dosage of 17.5 J·cm$^{-2}$ of UV light at 365 nm to re-form cross-links in the coating.

Figure 5:
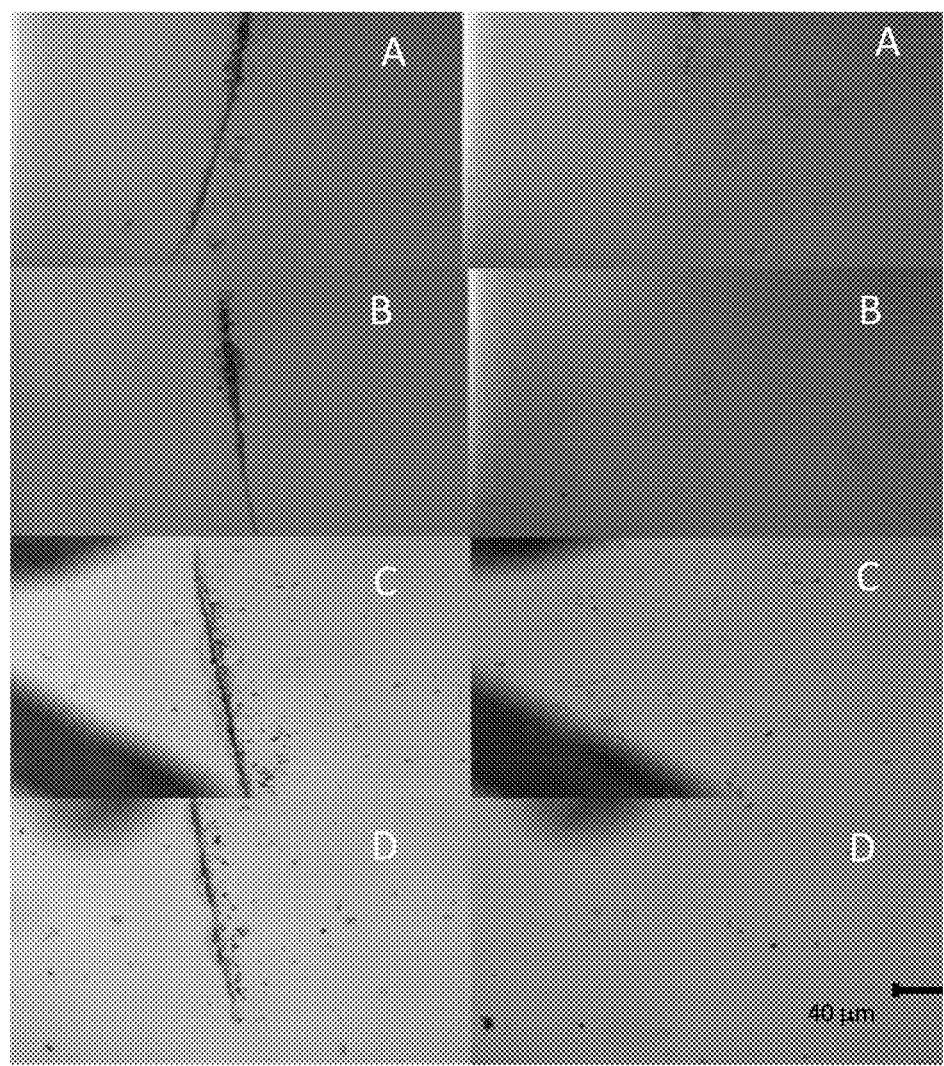
FIG. 5 depicts optical micrograph images of scratched (left) and healed coatings (right) formed by co-polymerisation of (meth)acrylate monomers and 3 mol % of 7-methacryloyloxycoumarin dimer: BMA monomer (A), MA monomer (B), HMA monomer (C) and EA monomer (D).

FIG. 5 shows optical microscopic images, recorded with an Olympus BX51 Microscope and a Nikon DS-Fi1 CCD camera of the coatings before (left) and after (right) two-step irradiation treatment. The images show that the scratches were substantially, and in places completely, healed. In all the coatings, defects with a width of about 30 μm could be completely healed, while defects with a width of about 50 μm could be remediated, but only incompletely healed.

As a control experiment, identical BMA, MA and HMA-based coatings with scratches applied by a razor blade were heated to above their glass transition temperature, but without irradiation. Healing of the scratches did not occur, establishing that the healing depicted in FIG. 5 is caused by mobilisation of the polymer in response to the UV light.

The invention claimed is:

1. A coating composition for forming a coating that at least partially mobilises in response to UV light, the composition comprising:
   a monomer selected from the group consisting of acrylates, methacrylates and mixtures thereof,
   a cross-linking agent comprising two sub-units covalently bonded together, each sub-unit comprising an unsaturated group which is co-polymerisable with the monomer,
   wherein the two sub-units are adapted to dissociate in response to irradiation by UV light, and
   wherein the cross-linking agent is present in the coating composition in an amount of less than about 15 mol % of the total of the monomer and cross-linking agent.

2. The coating composition according to claim 1, wherein the two sub-units are adapted to dissociate by a cycloelimination reaction in response to irradiation by UV light.

3. The coating composition according to claim 1, wherein the cross-linking agent is a [2π+2π] cycloaddition dimer or a [4π+4π] cycloaddition dimer of the two sub-units.

4. The coating composition according to claim 3, wherein the cross-linking agent comprises a dimer of coumarin, thymine, stilbene, cinnamic acid, anthracene, or derivatives or combinations thereof.

5. The coating composition according to claim 1, wherein the unsaturated group is selected from the group consisting of acryloyloxy and methacryloyloxy.

6. The coating composition according to claim 1, wherein the cross-linking agent has a structure of Formula I:

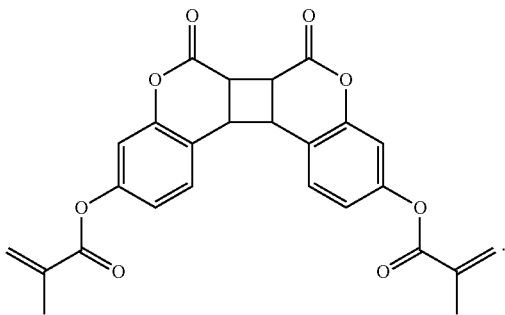

Formula I

7. The coating composition according to claim 1, further comprising a radical polymerisation initiator.

8. The coating composition according to claim 1, wherein a coating formed by polymerising the coating composition has a $T_g$ of at least about 45° C., and wherein irradiation of the coating by UV light at about 254 nm provides a reduction of $T_g$ of at least about 3° C.

9. A process for coating a substrate with a coating that at least partially mobilises in response to UV light, the process comprising:
   providing a substrate to be coated,
   providing a monomer selected from the group consisting of acrylates, methacrylates and mixtures thereof,
   providing a cross-linking agent comprising two sub-units covalently bonded together, each sub-unit comprising an unsaturated group which is co-polymerisable with the monomer, wherein the two sub-units are adapted to dissociate in response to irradiation by UV light,
   contacting the substrate with the monomer and the cross-linking agent, wherein the cross-linking agent is in an amount of less than about 15 mol % of the total of the monomer and cross-linking agent, and
   inducing co-polymerisation of the monomer and the cross-linking agent to form a polymer.

10. The process of claim 9, wherein the substrate is selected from the group consisting of a glass substrate, a metallic substrate, a polymeric substrate and a ceramic substrate, and combinations thereof.

11. A coating prepared by the process of claim 9.

12. A coating formed by applying the coating composition according to claim 1 to a substrate, and inducing polymerisation of the coating composition to form a polymer.

13. The coating of claim 12, wherein the substrate is selected from the group consisting of a glass substrate, a metallic substrate, a polymeric substrate and a ceramic substrate, and combinations thereof.

14. A coating that at least partially mobilises in response to UV light, comprising:
   a polymer comprising a monomer selected from the group consisting of acrylates, methacrylates and mixtures thereof and cross-linked by cross-linking groups,
   wherein the cross-linking groups comprise two sub-units covalently bonded together and adapted to dissociate by a cycloelimination reaction in response to irradiation by UV light to form pendant unsaturated groups,
   wherein the cross-linking groups are present in the polymer in an amount of less than about 15 mol % of the total of the monomer and cross-linking groups, and
   wherein the polymer, prior to irradiation by the UV light, comprises less than about 5 mol % of the pendant unsaturated groups relative to the cross-linking groups.

15. The coating of claim 14 having a $T_g$ of at least 45° C., wherein irradiation of the coating by UV light at about 254 nm provides a reduction of $T_g$ of at least about 3° C.

16. The coating of claim 14 having a $T_g$ of at least 100° C., wherein irradiation of the coating by UV light at about 254 nm provides a reduction of $T_g$ of at least about 10° C.

17. A coating according to claim 14, wherein a surface defect in the coating is treatable by irradiating the coating with UV light to at least partially mobilise the coating.

18. A process for healing a surface defect in the coating according to claim 14, comprising:
   irradiating the coating in a region around the defect with UV light with a wavelength below about 300 nm to at least partially mobilise the coating; and
   allowing polymer in the at least partially mobilised coating to flow into the defect.

19. The process of claim 18, wherein the coating is heated to above a $T_g$ of the polymer while irradiating the coating.

20. The process of claim 18, comprising an additional step of irradiating the coating in the region around the defect with UV light with a wavelength above about 300 nm to immobilise the coating in the region around the defect.

* * * * *